United States Patent [19]

Patin et al.

[11] 4,267,922
[45] May 19, 1981

[54] CHAIN WITH A SINGLE DIRECTION OF CURVATURE AND APPLICATION TO A HANDRAIL

[75] Inventors: Pierre Patin, Paris; Jean Plagne, St-Maur-des-Fossés, both of France

[73] Assignee: Regie Autonome des Transports Parisiens, Paris, France

[21] Appl. No.: 52,792

[22] Filed: Jun. 28, 1979

[30] Foreign Application Priority Data

Jul. 11, 1978 [FR] France .................. 78 20595

[51] Int. Cl.³ .................................... B65G 17/06
[52] U.S. Cl. ............................. 198/851; 198/334
[58] Field of Search ............. 198/851, 853, 335, 327, 198/334; 74/244 R, 244 C, 250 R, 250 C

[56] References Cited

U.S. PATENT DOCUMENTS 323,621  8/1885  Aregood .................... 198/851
3,884,152  5/1975  Emeriat ..................... 198/334

FOREIGN PATENT DOCUMENTS 499428  6/1930  Fed. Rep. of Germany ...... 198/851
1171813  6/1964  Fed. Rep. of Germany ...... 198/851

Primary Examiner—Robert B. Reeves
Assistant Examiner—Brian Bond
Attorney, Agent, or Firm—Kerkam, Stowell, Kondracki & Clarke

[57] ABSTRACT

The chain has a single direction of curvature and is capable of passing over pinions of small diameter. This chain is made up of a classic chain comprising at regular intervals a link to which is fixed a block having at least two rectilinear coplanar faces and tangent to the pins of the links and each extending over a length equal to the interval respectively from one part to the other of the link. An application of this chain consists in a variable speed handrail.

6 Claims, 6 Drawing Figures 4,267,922

CHAIN WITH A SINGLE DIRECTION OF CURVATURE AND APPLICATION TO A HANDRAIL

BACKGROUND OF THE INVENTION

The present invention relates to a chain with a single direction of curvature, that is, in which each link can pass freely only on one side with respect to the line of the axes of the divisor axles of adjacent links; thus, it can pass around two pinions while being practically without flexure between them under the action of a force tending to apply against them.

Chains with a single direction of curvature are known; they are used primarily as conveyors for merchandise. One known construction for such chains is described in French Pat. No. 1,297,285. A similar construction is described in French Pat. No. 2,207,069 (U.S. Pat. No. 3,884,152). This type of chain is perfectly adapted to certain uses, primarily for handling units. On the other hand, they have the inconvenience of not being suitable for small values of pitch, thus for pinions of small diameter, because each link must be small and the requirements of dimensional precision and of strength lead to a prohibitive cost in view of the large number of links therefore necessary.

Another type of chain with a single direction of curvature is described in French Patent Application No. 7420681. The chain has a single direction of curvature and is constituted by a normal chain mounted with blocks which prevent all possibility of bending in the half plane where they are located. But such a chain does not absorb shearing forces, thus the play and the elastic elongation of the links lead to a flexing in the moving portions of the length of chain supported between two pinions. This flexure could become rapidly prohibitive as soon as a sufficient force is applied on this length of chain.

BRIEF SUMMARY OF THE INVENTION

The object of the present invention is to define a chain with a single direction of curvature which can at the same time be simply manufactured, be strong, support weights without undergoing large flexure and capable of passing over pinions of small diameter.

The chain with a single direction of curvature in accordance with the invention is made up of a classic chain comprising at regular intervals a link to which is fixed a block having at least two rectilinear coplanar faces and tangent to the axles or pins of the links and each extending over a length equal to the interval, respectively from one part to the other of the link in the longitudinal direction of the chain, the rectilinear faces being disposed in quincunx.

Advantageously, said faces are three in number, one central and two lateral, the central face of a block interposing between the two lateral faces of the contiguous block.

In a particular embodiment, each of the said blocks further comprises an adjustment system coming into contact against the contiguous block. Advantageously, this system consists of a screw having a head coming into contact against a vertical face of the contiguous block.

BRIEF DESCRIPTION OF THE DRAWINGS

Other characteristics of the present invention will appear from a study of the example given hereafter as a non-limiting preferred embodiment and with regard to the accompanying drawings in which.

DESCRIPTION OF THE PREFERRED EMBODIMENT

Figure 1:
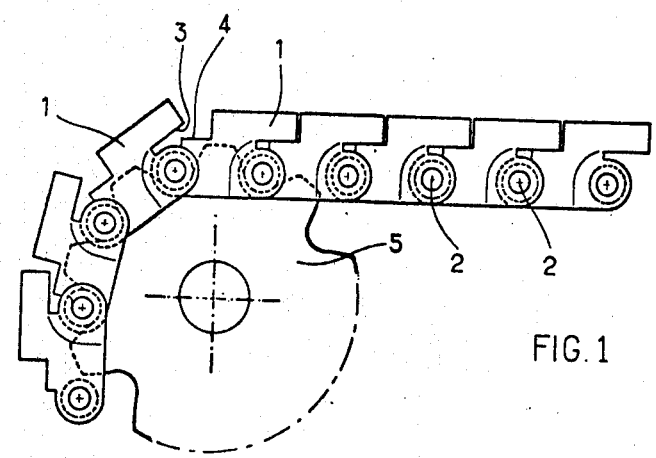
FIG. 1 represents in profile a portion of a chain having a single direction of curvature in accordance with the prior art.

The chain of known type and as shown in FIG. 1 is made up of links having cheeks 1 having a particular form. Cheeks 1 are connected to each other by a pin or axle 2, as in all chains, but further each comprises a face 3 which in the embodiment shown is parallel to the line of the pins 2, and which comes into engagement against another face 4 of the contiguous link. These bearing faces could equally be the two vertical faces shown or all others. Thus, each link can freely pivot around a pin but only in a half plane as the figure shows. This faculty allows the chain primarily to pass over a pinion 5 while all other curvature is impossible in the other direction, the faces 3 and 4 of successive links coming into contact one against the others. The number of teeth of pinion 5 cannot be reduced freely by reason of the problems of interference, polygonal effect and the like, resulting in a minimum radius of winding which cannot be further decreased for a given pitch of the links. But, the minimum size of the links and thus their minimum pitch is limited in practice by conditions of strength because the chain should be able to support a force perpendicular to itself between two supports and by reason of cost of manufacture because the unit cost of the cheeks of the links of complex form is relatively high and their number is large.

Figure 2:
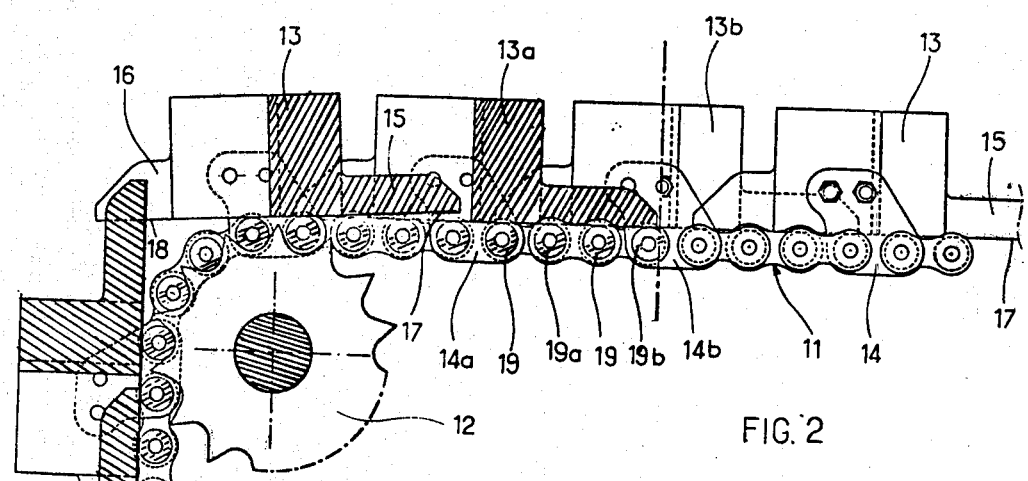
FIG. 2 is a partial sectional view on the line II—II of FIG. 3 of a chain in accordance with the present invention.

Such a chain is therefore not suitable when there is available only a reduced space for its return, that is, when pinions of small diameter must be utilized with respect to the general dimensions of the chain. The solution to such a problem consists therefore in combining a classic chain of low cost and with a sufficiently small pitch to accept pinions of small diameter with a means for preventing flexing in a direction and for which the pitch is much larger thus reducing the number of elements with respect to the number of links. This is obtained by the chain in accordance with the invention shown in FIGS. 2 and 3. FIG. 2 is a partial sectional view of a portion of chain along the lines II—II of FIG. 3 in the left part and an exterior view in the right part.

The chain in accordance with the invention comprises a classic chain 11 of which the pitch can be quite small so that pinion 12 on which it is enrolled can be of quite small diameter. Thus, the number of links is high but these being of simple form and fabricated in great lengths are of acceptable cost. So that this classic chain 11 can curve only in a single direction, the cheeks 14 of a link thereof taken at regular intervals, for example, of four links, are connected to a block 13 always located in the same sides of chain 11. Block 13 comprises principally parts 15 and 16 having faces 17 and 18 which are rectilinear and coplanar which come into tangency with the pins 19 of chain 11. These faces 17 and 18 extend respectively from one part to the other of the particular cheek 14 on a length equal to the interval in such a way as to be in contact with pins 19 of all of the links situated between the cheeks 14 of block 13 considered on one part and respectively each block 13 contiguous to the other part, the pin 19 against which engages the extremity of a part 15 or 16 being secured to the cheek 14 of a contiguous block 13. Thus in the case shown in FIG. 2, face 17 of part 15 of a block 13a is in contact with a pin 19b corresponding to the cheek 14b of contiguous block 13b then with two pins 19 corresponding to free links and finally, but possibly with a pin 19a corresponding to the cheek 14 of same block 13a. It is the same for face 18 of part 16 but then from the other side, that is toward the other contiguous block 13.

Figure 3:
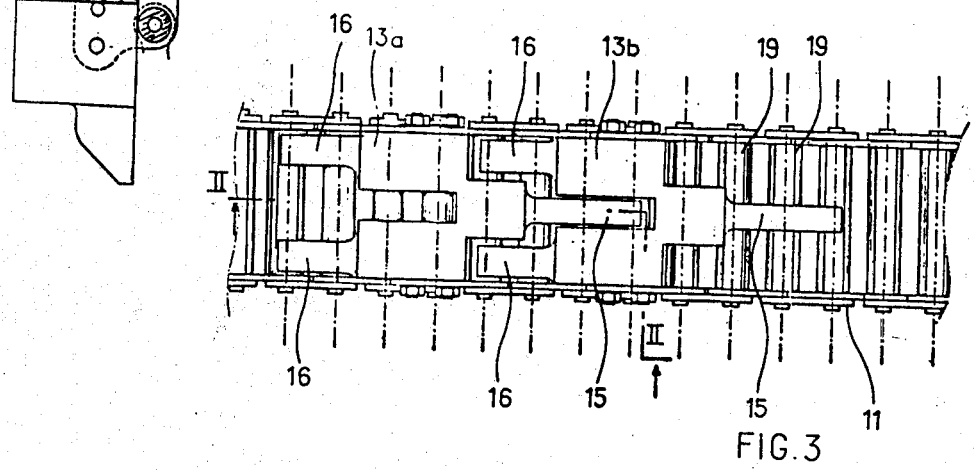
FIG. 3 is a partial view from above of the same chain.

It results that, in the portion of chain 11 between two successive cheeks 14 is located on one hand the part 15 toward the front of block 13 and on the other hand the parts 16 toward the back of contiguous block 13. So that these parts 15 and 16 can each be in contact with the same pins 19 of chain 11, they are disposed in quincunx, as FIG. 3 shows which is the view from above corresponding to FIG. 2 but in which two blocks 13 only, located in a straight portion, are shown. By reason of the symmetry of forces, each block 13 comprises two parts 16 toward the rear disposed laterally and a part 15 toward the front placed in the center.

The functioning of such a chain with a single direction of curvature is then obvious. In effect, faces 17 and 18 of parts 15 and 16 are in a plane tangent to pins 19 connected to cheeks 14 which carry the corresponding block 13. Thus, each neighboring link is free to pivot in the direction in which its pin 19 moves away from the corresponding face 17 or 18, and on the other hand, in the other direction, its movement is stopped when the pin 19 comes into contact against face 17 or 18. The chain has therefore only a single direction of possible curvature. As FIG. 2 shows, it can be freely turned around a pinion 12 of small diameter while its rigidity when encountering a force perpendicular to the plane of pins 19 is assured by blocks 13. The chain being supported by bearing on two pinions 12, this force is taken by the parts 15 and 16 which bear on the pins 19 connected to contiguous blocks 13 and thus step by step to pinion 12. At a pinion, part 15 or 16 bears on it through the intermediate of the last pin 19 in contact with the pinion which is also a pin corresponding to a cheek 14 and the pin of a free link.

When the link corresponding to a cheek 14 engages on pinion 12, block 13 pivots correspondingly and its face 17 is no longer in contact with the pins 19 of chain 11 (see block 13 at top left in FIG. 2). Conversely, when this link leaves the pinion, chain 11 being extended, faces 17 come in contact with pins 19 (at lower left of FIG. 2).

Figure 4:
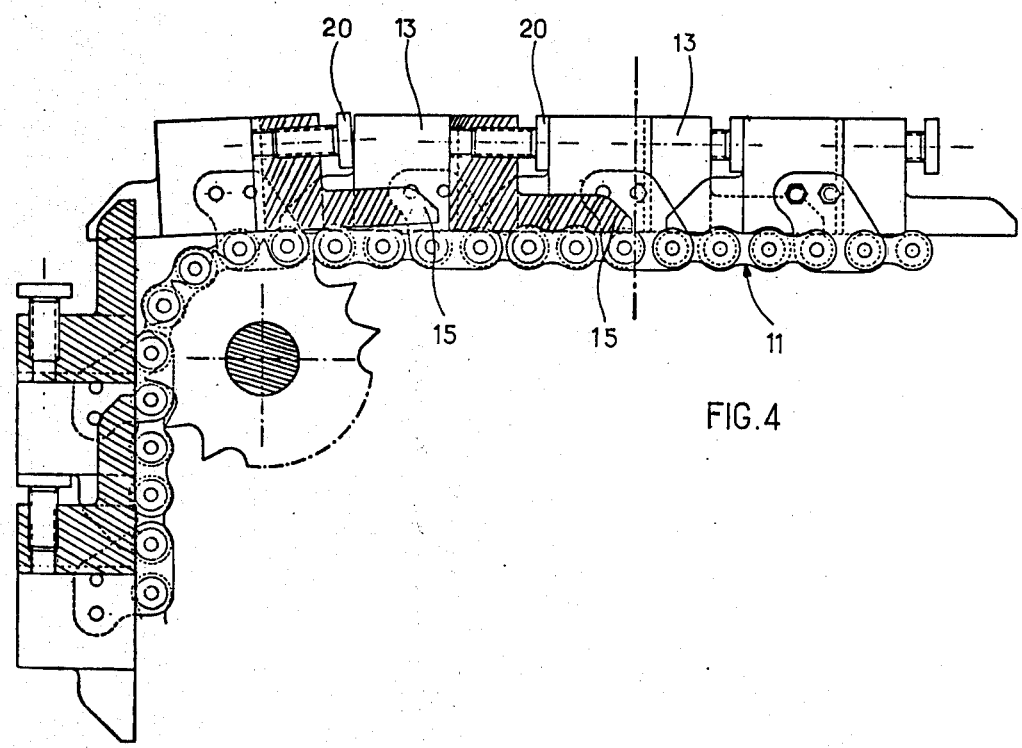
FIGS. 4 and 5 show profile and upper views of a chain in accordance with the invention comprising further a system for regulating flexing.
Figure 5:
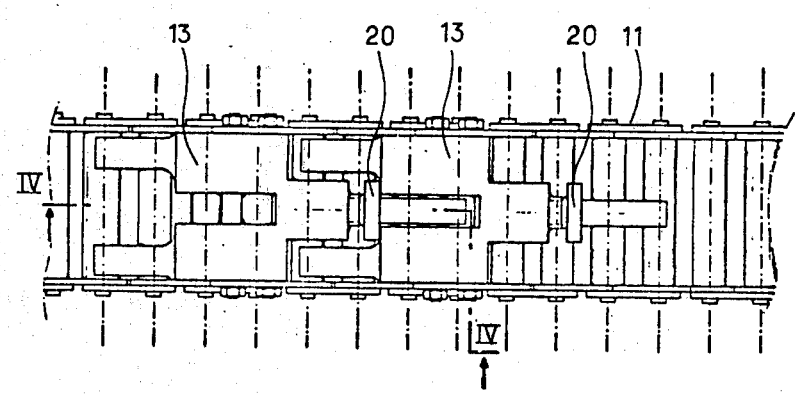

So that the chain described with respect to FIGS. 2 and 3 has a zero flexure, it is necessary that the position of faces 17 and 18 with respect to the exterior surface of the pins 19 be exact. But imperfections due to machining on one hand, and deformations and wear on the other hand can produce a counter direction flexing of the chain of more or less degree. To remedy this, a complementary adjustment structure is shown in FIGS. 4 and 5 which are equivalent to FIGS. 2 and 3 previously described. This arrangement consists of a screw 20 or other adjustable stop mounted in each block 13 with its head applied against a bearing face of a contiguous block 13. Screw 20, in absorbing the forces of compression existing in the exterior part of the chain, replaces or completes the action of corresponding parts 15 (in the embodiment shown) in the portion of the chain located between two bearing pinions 12.

On the other hand, screw 20 which is not in contact with the corresponding bearing face in the zones of enrollment around the pinions 12 is not always in the preceding or following zones these being on a length equal to the interval between the two cheeks 14; thus only the part 15 provides the anti-flexing action in these last zones which explains the necessity for maintaining it in spite of the presence of screw 20 which would suffice in the straight zones.

A chain with a single direction of curvature in accordance with the invention is applicable to numerous and varied uses. For example, it can serve as a conveyor for merchandise or baggage or to transport people and for this purpose blocks 13 support the elements constituting the work surface of the conveyor or transporter which are for example jointed plates which form a continuous straight surface.

Figure 6:
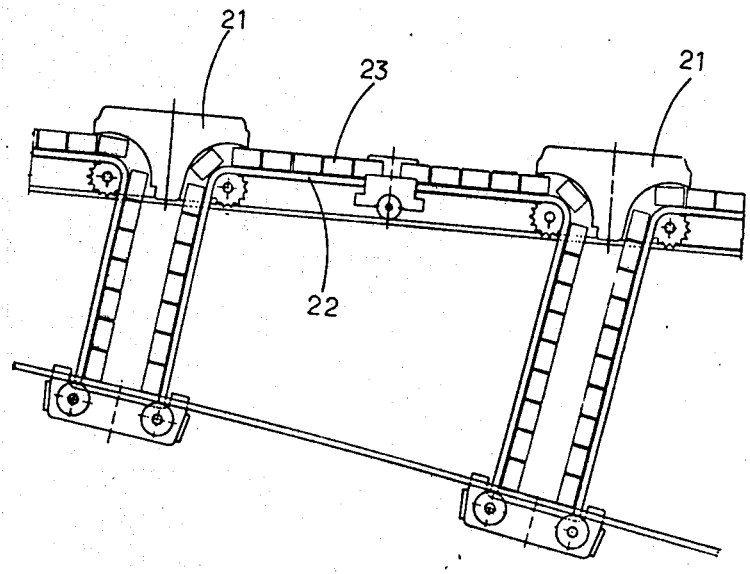
FIG. 6 shows a part of a variable speed handrail.

Another example of use is shown in FIG. 6 and consists in a handrail with variable speed such as described in the French patent application No. 7420681 U.S. Pat. No. 4,053,944) having individual handgrips interconnected by a deformable link with constant perimeter where the chain with a single direction of curvature in accordance with the invention constitutes at the same time the link and a rigid support between two handgrips. In this case, blocks 13 each have a cover which assures the continuity of the exterior surface.

We claim:

1. A chain with a single direction of curvature comprising a classic chain of single links and second links in regular succession and a block fixed to each of said second links having a plane face tangent to the axes of said second links extending on either side of said second links in the longitudinal direction of the chain over a length at least equal to the total length of said single links adjacent said second links, adjacent ones of said blocks overlapping along the chain.

2. A chain as described in claim 1 characterized by the fact that said face has three parts, a central part and two lateral parts, the central part of a block coming into position between the two lateral parts of a contiguous block.

3. A chain in accordance with either of claims 1 or 2 characterized by the fact that each of the said blocks comprises further an adjusting system coming into bearing against the contiguous block.

4. A chain in accordance with claim 3 characterized by the fact that the adjustment system consists of a screw having a head bearing against a face of the contiguous block perpendicular to said face tangent to the axes.

5. A chain forming a handrail for a variable speed transporter constituted by individual handgrips connected by a deformable link having a constant perimeter characterized by the fact that the link is a chain having a single direction of curvature in accordance with any of claims 1 to 4.

6. A chain in accordance with claim 5 characterized by the fact that said blocks each have a cover providing continuity of the exterior surface.

* * * * *